US006883452B1

(12) United States Patent
Gieseke

(10) Patent No.: US 6,883,452 B1
(45) Date of Patent: Apr. 26, 2005

(54) PLUNGING TOWED ARRAY ANTENNA

(75) Inventor: Thomas J. Gieseke, Newport, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 19 days.

(21) Appl. No.: 10/679,675

(22) Filed: Oct. 6, 2003

(51) Int. Cl.⁷ ............................................. B63B 21/66
(52) U.S. Cl. ...................................... 114/244
(58) Field of Search ..................... 114/244, 336, 338, 114/326, 328; 343/709

(56) References Cited

U.S. PATENT DOCUMENTS

| 3,972,046 A | * | 7/1976 | Lombardi ................. 343/709 |
| 4,189,703 A | | 2/1980 | Bennett |
| 4,387,450 A | | 6/1983 | Zachariadis |
| 4,473,896 A | | 9/1984 | Loeser et al. |
| 5,309,412 A | | 5/1994 | Bourgeois |
| 6,307,810 B1 | | 10/2001 | Shany et al. |

* cited by examiner

Primary Examiner—Ed Swinehart
(74) Attorney, Agent, or Firm—James M. Kasischke; Michael P. Stanley; Jean-Paul A. Nasser

(57) ABSTRACT

A towed antenna system and method of use includes a communication device disposed on a buoyant body attached to a housing by a tether. The housing includes a spool, a reel-wire guide, and a motor. The buoyant body and the reel housing are deployed from and towed at from a submerged platform. Hydrodynamic forces from towing prevent the buoyant body from rising to the surface while maintaining the housing at an equilibrium depth. To establish communication, the tether is released from the spool and the buoyant body rises to the surface. The tether is released until the communication session is over or until the tether is fully deployed. The reel-wire guide prevents the tether from becoming snagged during release. Once the communication session has been completed, the tether is retracted and the buoyant body re-establishes its equilibrium depth.

10 Claims, 3 Drawing Sheets

PLUNGING TOWED ARRAY ANTENNA

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a towed antenna system and more particularly, to a plunging towed antenna system.

(2) Description of the Prior Art

Submersible vehicles must occasionally communicate with surface ships, satellites, aircraft, and other platforms as part of their operation. In order to broadcast and receive radio transmissions, they must deploy a large antenna above the ocean surface. To maintain stealth, for example, the submarine must remain submerged during this deployment. There are several known ways to accomplish this.

According to one method of antenna deployment, an antenna is mounted to a mast that is incorporated into the submarine sail. When the submarine needs to communicate, the mast is deployed from the submarine sail by extending the antenna to the ocean surface similar to the extension of a periscope.

Mast deployed or mounted antennas are associated with several problems. In a first example, mast antennas create a significant wake when deployed at moderate boat speeds. This wake can be easily detected with electromagnetic, infrared, and optical sensors. Consequently, ship speeds are limited when a mast antenna pierces the surface and a wake is created.

Utilizing another method of antenna deployment, a submersible vehicle can communicate with other platforms while submerged using a buoyant towed antenna. A buoyant towed antenna typically includes a buoyant body that is connected by a tether to a winch disposed on the submerged vehicle. The winch allows the submerged vehicle to deploy the buoyant towed antenna to the ocean surface allowing the submerged vehicle to communicate with other platforms, and then to retrieve the buoyant towed antenna when the communication has been completed. Known buoyant towed antenna systems, however, use a winch that cannot operate in a "freewheel" manner, i.e. the winch does not permit the spool to spin freely. Thus, the winch must be powered in either direction to deploy or reel the buoyant towed antenna in.

Buoyant towed antennas do not create large wakes associated with mast antennas while being towed, however, when towed at moderate speeds, their dynamic interactions with surface waves and the tow cable cause buoyant towed antennas to occasionally plunge under the ocean surface, crash through ocean waves, violently pitch and yaw, and create water sprays. All of these high-speed motion effects interfere with the operation of the onboard electromagnetic communication devices.

SUMMARY OF THE INVENTION

Accordingly, it is a general purpose and primary object of the present invention to provide a system that allows a submersible vehicle to maintain its stealth and stay submerged, while still allowing the submersible vehicle to effectively communicate with other platforms.

To obtain the objects described, there is provided a buoyant antenna system adapted to be towed behind a submerged platform. The buoyant towed assembly includes a buoyant body, a tether and a reel housing. The buoyant body includes at least one communication device and is adapted to propel to a surface of a body of water. The tether includes a first end connected to the buoyant body and a second end connected to the reel housing. The reel housing is adapted to be connected to a primary tow assembly disposed on the submerged platform.

The reel housing generally includes at least one aperture, a spool, a motor in communication with and driving the spool. The spool is adapted to contain a substantial length of the tether.

The reel housing may be disposed within the submerged platform or the buoyant body, but is preferably a separate body disposed between the submerged platform and the buoyant body.

The reel housing optionally includes a depressor and a reel-wire guide. The depressor controls the buoyant elevation of the reel housing while the reel-wire guide prevents the tether from becoming jammed within the reel housing. Additionally, the reel housing may also include at least one bushing disposed about the aperture to prevent chafing of the tether.

The present invention also features a method of deploying a buoyant body having a communication device from a submerged platform at high-speed. The method includes releasing a reel housing from a submerged platform and subsequently establishing an equilibrium depth for the reel housing. A tether cable connecting the reel housing to a buoyant body is then released from the reel housing and is allowed to float to the surface of the water. Once on the surface, a communication operation with another platform is established while the tether is continuously released from the spool. Upon the completion of the communication operation or upon the depletion of the tether from the spool, the cable is retrieved by the reel housing. Additionally, the buoyant body is re-submerged and an equilibrium depth in re-established. Throughout the entire process, the submerged platform maintains a high-speed. The method further includes re-releasing the tether to establish a subsequent communication, if necessary.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
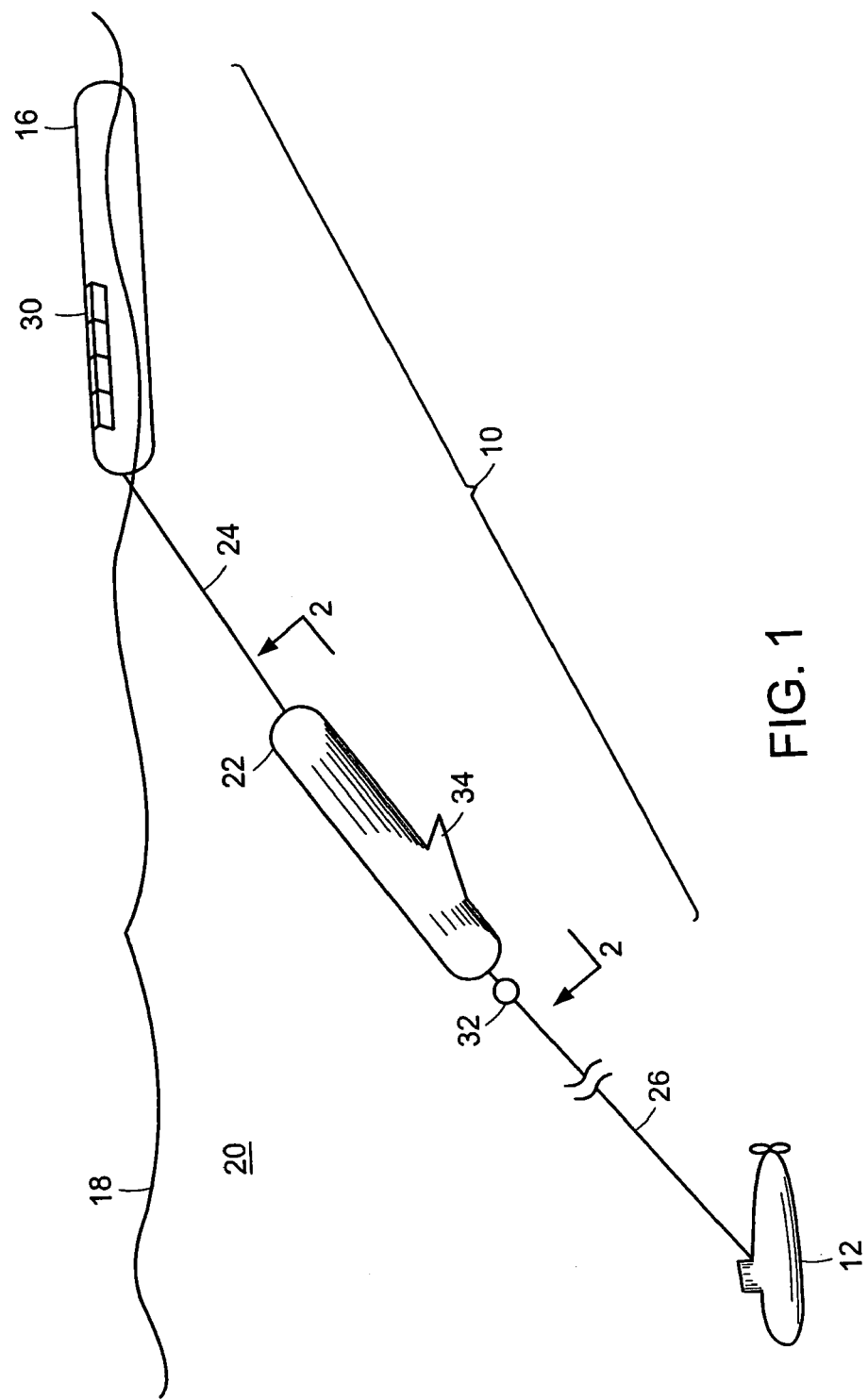
FIG. 1 is a schematic view of a deployed towed antenna system of the present invention.

Referring now to the drawings wherein like numerals refer to like elements throughout the several views, one sees that FIG. 1 depicts the towed antenna system 10 of the present invention. The towed antenna system 10, as shown, allows a submarine or submerged platform 12 operating at relatively high-speeds to tow a buoyant body 16 on the surface 18 of a body of water 20 while eliminating intermittent plunging and wave wash-over as well as the creation of significant surface waves.

The towed antenna system 10 includes the buoyant body 16 attached to a reel housing 22 using a tether 24. The reel housing 22 is attached to the submerged platform 12 using a tow cable 26.

The buoyant body 16 floats on the surface 18 and is preferably designed to minimize turbulence and drag from any surface waves; including any design known to those skilled in the art.

The buoyant body 16 includes any known communication device 30 such as, but not limited to, an electromagnetic transmitting/receiving antenna. The communication device 30 is typically disposed on the surface of the buoyant body 16, though the exact placement of the communication device 30 will depend upon the characteristics of the specific communication device 30 used.

The buoyant body 16 is preferably connected to the reel housing 22 preferably using a high strength cable as the tether 24. The tether 24 may optionally include a communication wire such as, but not limited to, a composite cable or fiber optic filaments that allow the communication device 30 to transfer data to and from the submerged platform 12. Alternatively, the communication device 30 may communicate with the submerged platform 12 using any known wireless communication methods such as, but not limited to, electromagnetic communication.

The reel housing 22 may be incorporated into the buoyant body 16 or the primary tow system, i.e. the handling system onboard the submerged platform 12, but is preferably a separate body that is connected to the submerged platform 12 using the tow cable 26 and a suitable connection 32 such as, but not limited to, a shackle, turnbuckle, or splice cable.

For the sake of brevity, and not intended to be a limitation of the present invention, the towed antenna system 10 will be described wherein the reel housing 22 is a separate body, though one skilled in the art will be able to readily determine any modifications necessary to incorporate the reel housing 22 into the buoyant body 16 or the handling system aboard the submerged platform 12.

Accordingly, the reel housing 22 preferably has the streamline shape shown in FIG. 1 to reduce the amount of drag and turbulence generated as the reel housing is towed through the body of water 20. The reel housing 22 includes a wing-like depressor 34 as will be described in greater detail hereinbelow.

Figure 2:
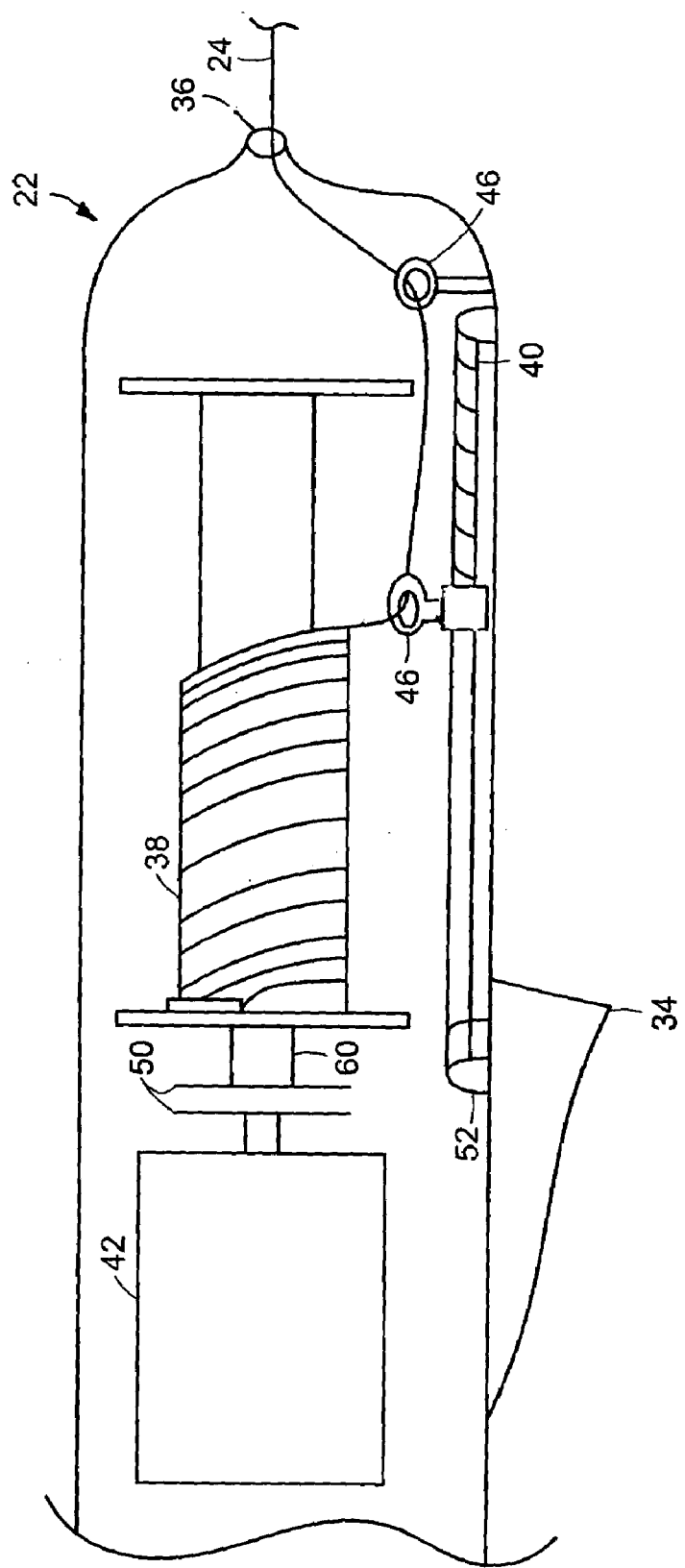
FIG. 2 is a cross-sectional view of the reel housing of the towed antenna system of the present invention with the view taken from reference line 2—2 of FIG. 1.

Referring now to FIG. 2, the reel housing 22, generally includes at least one aperture 36, a spool 38, a reel-wire guide 40, and a motor 42. The tether 24 enters and exits the reel housing 22 through the aperture 36, which preferably includes a bushing (not shown) or the like to reduce friction on the tether 24. The tether 24 is then wrapped around the spool 38 after being guided through one or more pulleys 46 or guide rings.

The tether 24 is connected to the spool 38 using any connection known to those skilled in the art thereby allowing the spool 38 to reel the tether 24 in. A connection 50, such as a slip ring or the like, provides a suitable electrical connection between the tether 24, the spool 38 and the tow cable 26 when a communication wire is used in the tether 24 and allows a signal transmitted by the communication device 30 to be transmitted through the tow cable 26.

The spool 38 preferably has a small diameter that allows the spool to hold a relatively long length of the tether 24. Consequently, the provided tether 24 should tolerate a small bending radius.

The reel-wire guide 40 includes one or more pulleys 46 that direct the tether 24 around the length of the spool 38 as the motor 42 rotates the spool 38, thus preventing the tether 24 from becoming snagged or jammed within the reel housing 22. The reel-guide 40 preferably includes a lead screw assembly 52 acting with the rotation of the spool 38, but may include any reel-guide design that directs the tether 24 about the length of the spool.

Figure 3:
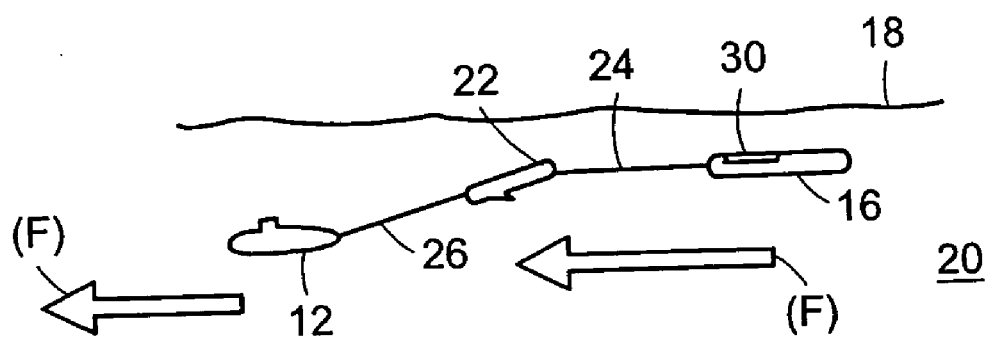
FIG. 3 is a schematic view of the towed antenna system of the present invention with the towed antenna system partially deployed at an equilibrium depth from a submerged platform.
Figure 4:
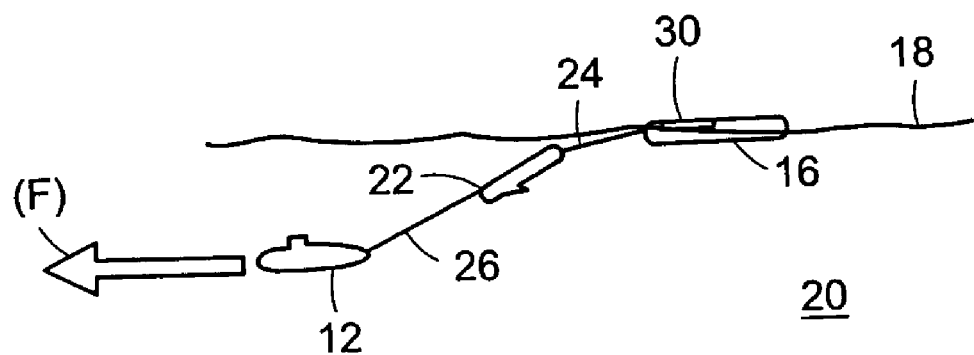
FIG. 4 is a schematic view of the towed antenna system of the present invention fully deployed from a submerged platform with the view taken from reference line 2—2 of FIG. 1.

Use of the towed antenna system 10 is depicted in FIGS. 3 and 4. Initially, the buoyant body 16 and the reel housing 22 are deployed from the submerged platform 12 and are towed at a high-speed. The hydrodynamic forces (F) on the tether 24 and reel housing 22, and the buoyant body 16 prevent the buoyant body 16 from rising to the ocean surface 18. The depressors 34 on the reel housing 22 include stabilizing or control surfaces that allow the reel housing 22 to be deployed to a certain depth from the surface 18 (preferably about 20 feet) and slow the speed of the reel housing 22 rising to the surface 18. (See FIG. 2) In this condition, the tether 24 is substantially wound about the spool 38 within the reel housing 22.

Referring specifically to FIG. 4, the submerged platform 12 communicates with another platform (not shown) starting with a signal (either a wireless signal or a signal transmitted through the communication wire disposed in the tow cable 11) transmitted from the submerged platform to the motor 42.(See FIG. 2) The transmitted signal releases a clutch 60 disposed between the spool 38 and the motor 42 thereby allowing the spool 38 to spin freely to rapidly release the tether 34 from the spool 38. The clutch 60 includes any clutching mechanism known to those skilled in the art such as, but not limited to, a high friction disk disposed between a flywheel and a pressure plate or a racket-style clutch.

The reel-guide 40 ensures that the tether 24 does not become snagged or jammed within the reel housing 22. As the tether 24 is released from the reel housing 22, the buoyant body 16 slows down and the forces (F) generated against the buoyant body 16 are also reduced, thus allowing the buoyant body 16 to rise to the ocean surface 18. Upon the buoyant body 16 reaching the ocean surface 18, the communication device 30 establishes a communication with another platform. The tether 24 is continuously released from the spool 38 until either the communication is complete or the supply of tether 24 on the spool 38 is exhausted.

Once the communication has been completed, or the supply of tether 24 on the spool 38 is exhausted, another signal is transmitted from the submerged platform 12 to the motor 42 which engages the clutch 60 and reverses the motor. The motor 42 reels in the tether 24, as well as the buoyant body 16, toward the reel housing assembly 22. The motor 42 is powered by an electrical source (not shown) disposed in the reel housing 22 or the submerged platform 12. When the desired amount of the tether 24 has been reeled in, the motor 42 stops. The reel housing 22 and the buoyant body 16 are then allowed to rise to their equilibrium depths (as shown in FIG. 3), and the process is then repeated, when required or desired.

The towed antenna system 10 of the present invention allows the submerged platform 12 to maintain a relatively high and constant speed while allowing the buoyant body 16 to intermittently pop up to the ocean surface 18, conduct communication operations, and then quickly disappear beneath the ocean surface 18. The buoyant body 16 therefore reduces a large hydrodynamic wake that could be detected by a variety of sensing devices.

In light of the above, it is therefore understood that within the scope of the appended claims, the invention may be practiced otherwise than as specifically described.

What is claimed is:

1. A system for towing an antenna, said system comprising:
   a buoyant body supporting the antenna;
   a tether having a first end connected to said buoyant body; and
   a towable housing connected to a second end of said tether, said towable housing having an aperture formed therein including:
   a spool mounted to said towable housing for deploying a length of said tether through said aperture and exterior to said towable housing;
   a motor mounted to said towable housing and in rotationable communication with said spool; and
   a clutch mechanically connected to said motor for controlling said motor thereby controlling the rotation of said spool and the deployment of said tether such that the towed position of said buoyant body and the antenna is reactive to the deployment of said tether.

2. The system in accordance with claim 1 wherein said clutch is actuated by a signal from a submerged platform towing said towable housing.

3. The system in accordance with claim 2 wherein said towable housing further includes at least one exterior hydrodynamic depressor.

4. The system in accordance with claim 3 wherein said towable housing further includes a guide with a lead screw assembly, said lead screw assembly mechanically connected to and responsive to the rotation of said spool as said tether is guided by said guide.

5. The system in accordance with claim 1 wherein said towable housing further includes at least one exterior hydrodynamic depressor.

6. The system in accordance with claim 5 wherein said towable housing further includes a guide with a lead screw assembly, said lead screw assembly mechanically connected to and responsive to the rotation of said spool as said tether is guided by said guide.

7. The system in accordance with claim 1 wherein said towable housing is disposable within a submerged platform towing said buoyant body.

8. The system in accordance with claim 7 wherein said towable housing further includes a guide with a lead screw assembly, said lead screw assembly mechanically connected to and responsive to the rotation of said spool as said tether is guided by said guide.

9. A system for towing an antenna, said system comprising:
   a tether having a first end connectable to a towing platform;
   a buoyant body for supporting the antenna and connected at a second end of said tether, said buoyant body having an aperture formed therein including:
   a spool mounted to said buoyant body for deploying a length of said tether through said aperture and exterior to said buoyant body;
   a motor mounted to said buoyant body and in rotationable communication with said spool; and
   a clutch mechanically connected to said motor for controlling said motor thereby controlling the rotation of said spool and the deployment of said tether such that the towed position of said buoyant body and the antenna is reactive to the deployment of said tether.

10. The system in accordance with claim 9 wherein said buoyant body further includes a guide with a lead screw assembly, said lead screw assembly mechanically connected to and responsive to the rotation of said spool as said tether is guided by said guide.

* * * * *